(12) United States Patent
Baranski

(10) Patent No.: US 9,634,374 B2
(45) Date of Patent: Apr. 25, 2017

(54) GLAZING COMPRISING ANTENNAS AND A METHOD OF MANUFACTURING SAID GLAZING

(71) Applicant: PILKINGTON GROUP LIMITED, Nr. Ormskirk, Lancashire (GB)

(72) Inventor: Detlef Baranski, Marl (DE)

(73) Assignee: PILKINGTON GROUP LIMITED, Nr. Ormskirk, Lancashire (GB)

( * ) Notice: Subject to any disclaimer, the term of this patent is extended or adjusted under 35 U.S.C. 154(b) by 4 days.

(21) Appl. No.: 14/653,707

(22) PCT Filed: Dec. 20, 2013

(86) PCT No.: PCT/GB2013/053383
§ 371 (c)(1),
(2) Date: Jun. 18, 2015

(87) PCT Pub. No.: WO2014/096848
PCT Pub. Date: Jun. 26, 2014

(65) Prior Publication Data
US 2016/0006107 A1 Jan. 7, 2016

(30) Foreign Application Priority Data

Dec. 21, 2012 (GB) .................................. 1223253.4

(51) Int. Cl.
*H01Q 1/40* (2006.01)
*H01Q 1/12* (2006.01)
(Continued)

(52) U.S. Cl.
CPC ..... *H01Q 1/1271* (2013.01); *B32B 17/10376* (2013.01); *H01Q 1/1285* (2013.01);
(Continued)

(58) Field of Classification Search
CPC ...... H01Q 1/1271; H01Q 1/3275; H01Q 1/02; H01Q 1/40; H01Q 1/38
(Continued)

(56) References Cited

U.S. PATENT DOCUMENTS 5,099,250 A 3/1992 Paulus et al.
6,313,796 B1 11/2001 Potin et al.
(Continued)

FOREIGN PATENT DOCUMENTS

DE 44 15 675 C1 8/1995
EP 0 608 180 A1 7/1994
(Continued)

OTHER PUBLICATIONS

International Search Report (PCT/ISA/210) mailed on Mar. 13, 2014, by the European Patent Office Patent Office as the International Searching Authority for International Application No. PCT/GB2013/053383.
(Continued)

*Primary Examiner* — Joseph Lauture
(74) *Attorney, Agent, or Firm* — Buchanan Ingersoll & Rooney PC

(57) ABSTRACT

A compact arrangement of antennas in a glazing is disclosed, which allows a plurality of antenna wires to be connected to an external circuit by a single contact. Parallel conductors, in direct current isolation from each other so that alternating current coupling occurs between them, are embedded at different depths in the thickness of a ply of plastic material. In plan view, conductors at different depths may be positioned closer to each other than in the prior art, so antennas connected to them are less obtrusive and may even be hidden completely under an obscuration band. Different widths of parallel conductor may be used. A thin antenna, connected to
(Continued)

a thin conductor, may be positioned in a vision area of a glazing without impeding the view.

17 Claims, 5 Drawing Sheets

(51) Int. Cl.
    H01Q 21/28    (2006.01)
    B32B 17/10    (2006.01)
    H01Q 21/00    (2006.01)
    H01Q 1/02     (2006.01)
    H01Q 1/32     (2006.01)
    H01Q 1/38     (2006.01)
(52) U.S. Cl.
    CPC ........... *H01Q 1/40* (2013.01); *H01Q 21/0075* (2013.01); *H01Q 21/0087* (2013.01); *H01Q 21/28* (2013.01); *H01Q 1/02* (2013.01); *H01Q 1/3275* (2013.01); *H01Q 1/38* (2013.01)
(58) Field of Classification Search
    USPC .............. 343/713, 711, 704, 850, 873
    See application file for complete search history.

(56) References Cited

U.S. PATENT DOCUMENTS

| 6,369,767 B1 | 4/2002 | Oka et al. |
| 2008/0024379 A1 | 1/2008 | Urban et al. |
| 2010/0085261 A1 | 4/2010 | Baranski |
| 2010/0231466 A1* | 9/2010 | Hisaeda ............... H01Q 1/1271 343/713 |
| 2012/0154229 A1 | 6/2012 | Kagaya et al. |

FOREIGN PATENT DOCUMENTS

| EP | 2453521 A1 | 5/2012 |
| FR | 2235502 A1 | 1/1975 |
| JP | 2010-115926 A | 5/2010 |
| WO | 2008/058855 A1 | 5/2008 |

OTHER PUBLICATIONS

Patents Act 1977:Search Report Under Section 17 dated Jun. 4, 2013 issued in the corresponding Great Britain Patent Application No. 1223253.4 (2 pages).

* cited by examiner

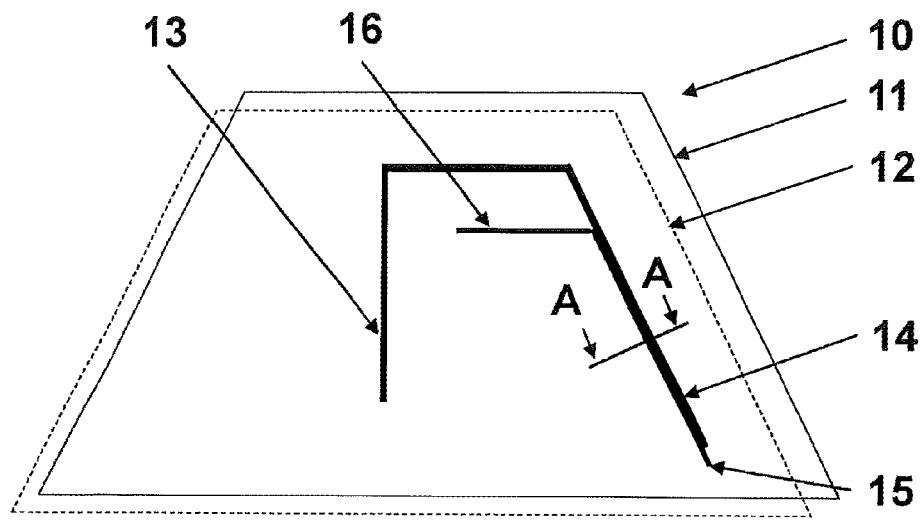
Fig. 1
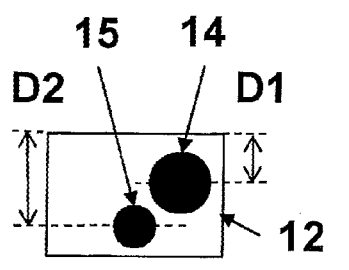
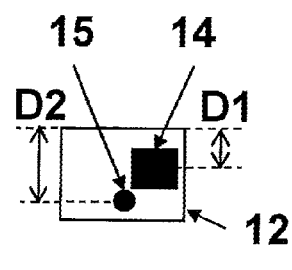
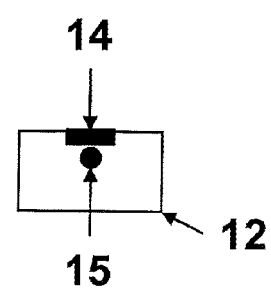
Fig. 2a        Fig. 2b        Fig. 2c

GLAZING COMPRISING ANTENNAS AND A METHOD OF MANUFACTURING SAID GLAZING

BACKGROUND OF THE INVENTION

The invention is concerned with a glazing, having a ply of plastic material, in which antennas are embedded.

The number of antennas in glazing is increasing due to, for example, the demand for more communication systems in vehicles. Such communication systems in vehicles includes radio (AM, FM), digital audio broadcasting (DAB), television (TV), digital video broadcasting-terrestrial (DVB-t), telephone (GSM), navigation (GPS), WLAN, remote keyless entry (RKE), car-to-car communication and car-to-infrastructure communication (car2X) and paging systems. For all these communication systems, it is desirable to have separate optimised antennas, which need to be connected to electronic devices within automotive vehicles, typically located away from the glazing. A large number of proposals for providing such antennas and connections have been made in the art.

DE4415675C1 discloses a glazing comprising a ply of plastic material, used as an interlayer of a laminated glass, and two antenna wires in electrical isolation from each other, embedded in the ply of plastic material. Each antenna is provided with a direct current connection to a conductor folded around an edge of the ply of glazing material so that a conductive connection is made between the antenna in the glazing and an external circuit via the conductor.

US2010/0231466A1 discloses a glazing comprising a ply of plastic material, used as an interlayer of a laminated glass, and at least one antenna embedded in the ply of plastic material, comprising a plurality of antenna elements. A plurality of antenna elements forming an intersection are replaced with an antenna element in the shape of the intersection stamped from a sheet-like conductor. All antenna elements have uniform thickness so as to eliminate the problem that two antenna wires overlapping in the thickness of the ply of plastic material could result in gaps between the ply of plastic material and the two plies of glazing material after a lamination process.

U.S. Pat. No. 5,099,250 discloses a glazing comprising first and second conductors in direct current isolation from each other and being arranged to run adjacent to, and parallel to, each other so that alternating current coupling occurs between them. The first conductor is connected to an external circuit and the second conductor is connected to an antenna, so that signals received by the antenna are transmitted to the external circuit via the first and second conductors. The first and second conductors flank each other with a non-zero distance between adjacent edges in the plane of the glazing.

It is desirable to find a glazing, and a method of manufacturing such glazing, having a plurality of antennas in the glazing and a means of connection to an external circuit in a compact arrangement that will take up less of the glazing area, and having a low risk of gaps resulting after lamination. The present invention aims to address these problems.

SUMMARY OF THE INVENTION

According to the invention from a first aspect, a glazing is provided comprising the features set out in claim 1 attached hereto. A substantially planar glazing is planar in a limited region and thus includes glazing bent in horizontal and vertical directions, thereby comprising a plurality of substantially planar portions.

In an advantageous embodiment of the invention, the average distance between the first and second conductors is less than or equal to one millimeter. More preferably, the average distance between first and second conductors is less than or equal to 0.40 millimeters, even more preferably less than or equal to 0.20 millimeters and most preferably less than or equal to 0.06 millimeters.

The average distance between the first and second conductors is the arithmetical average of distances over a portion of the length. Distance is the shortest distance between adjacent edges of the first and second conductors.

In an advantageous embodiment of the invention, the first and second conductors fully overlap each other in the direction of the thickness of the ply of plastic material.

The first and second conductors may have at least one turn of the same shape. Preferably the first and second conductors have at least two turns of the same shape. Preferably the shape is a meander. Alternatively the shape is a spiral.

In an advantageous embodiment of the invention, a contact is on a surface of the ply of glazing material and in direct current isolation from the first and second conductors and the contact overlaps at least one conductor so that alternating current coupling occurs therebetween. The first conductor may be made from a sheet of conductive material.

In an advantageous embodiment of the invention, a contact has a conductive connection to the first conductor and is in direct current isolation from the second conductor, so that the first and second conductors share a single connection to an external circuit via the contact, so enabling a transfer of signals from the first and second conductors to the external circuit.

In an advantageous embodiment of the invention, a flexible conductor in direct current connection with the contact is folded around an edge of the ply of glazing material.

In an advantageous embodiment of the invention, the second conductor is thinner than the first conductor. A thin antenna, connected to a thin conductor, is less visible so may be positioned in a vision area of the glazing without obscuring the view.

In an advantageous embodiment of the invention, the thinner conductor is made of tungsten, nanowire or carbon nanotube. The thicker conductor is made of copper.

In an advantageous embodiment of the invention, at least one conductor is at least partially hidden from view by an obscuration band. The obscuration band may at least partially hide the first conductor. The obscuration band may at least partially hide two conductors.

In an advantageous embodiment of the invention, a third conductor is configured adjacent to a portion of the first conductor, wherein the first and second conductors are in direct current isolation from the third conductor and the third conductor is substantially parallel to the portion of the first conductor so that alternating current coupling occurs therebetween.

In an advantageous embodiment of the invention, the length of the second conductor is selected to be approximately equal to an odd multiple of a quarter of an effective wavelength in the glazing Lambda Effective corresponding to a resonant frequency f, such that the second conductor and the first conductor form a transmission line acting as a band-pass filter, and signals in the second conductor, in a bandwidth centred on f, are transferred to the first conductor by alternating current coupling. Bandwidth is defined as the range of frequencies in which the signal reception is sufficient for the required use.

The first and second conductors may be wire without insulation. The width of a conductor without insulation is preferably less than 0.15 millimeters, more preferably less than 0.1 millimeters and most preferably less than 0.07 millimeters.

In an advantageous embodiment of the invention, at least one conductor is a strip made from a sheet of conductive material. The width of the strip of conductive material is preferably less than or equal to 2 centimeters, more preferably less than 1.5 centimeters and most preferably less than 1 centimeter.

In an advantageous embodiment of the invention, at least one conductor is insulated wire. The wire diameter, including insulation, is preferably less than 0.21 millimeters, more preferably less than 0.16 millimeters and most preferably less than 0.13 millimeters. Preferably, the insulation thickness is less than 0.03 millimeters.

According to the invention from a second aspect, a method of manufacturing an antenna glazing comprises the steps set out in claim 13 attached hereto.

Preferably, the average distance between first and second conductors is less than 1 millimeter.

Preferably, first and second conductors are configured to overlap each other in the direction of the thickness of the ply of plastic material.

The first and second conductors may be embedded in the ply of plastic material using an ultrasonic soldering tool. The ultrasonic soldering tool may have a tip of width less than or equal to 4 millimeters. Preferably the tip width is less than or equal to 3 millimeters. Most preferably the tip width is in the range between 2 millimeters and 1 millimeter.

According to the invention it is possible to connect a plurality of antennas to an external circuit by a single contact, in a compact arrangement with a low risk of gaps resulting after lamination. Due to the alternating current coupling between the first and second conductors only one contact is required so the number of components is reduced. Due to embedding the first and second conductors at different depths, the area of glazing occupied by the conductors is reduced, so the conductors are less obtrusive. The area occupied by the conductors may be so small that the conductors may be hidden under an obscuration band. Furthermore the width of the second conductor and second antenna may be made thinner with the result that the second antenna is so unobtrusive that it may be positioned in a vision area of the glazing. Tests in an anechoic chamber demonstrate that the performance of at least two antennas in a glazing provided with adjacent, parallel, mutually coupled conductors at different depths at least partially obscuring each other is acceptable for standards applicable to automotive glazing.

BRIEF DESCRIPTION OF THE DRAWINGS

The invention will now be described by means of non-limiting examples with reference to the attached figures:

FIG. 1 shows a glazing according to the invention;

FIG. 2a shows a glazing according to the invention in cross-section on line A-A of FIG. 1;

FIG. 2b shows a glazing as FIG. 2a and the depths D1, D2 of the conductors, the first conductor being a sheet of conductive material;

FIG. 2c shows a glazing in cross-section in which conductors fully overlap;

DETAILED DESCRIPTION OF THE INVENTION

Figure 3:
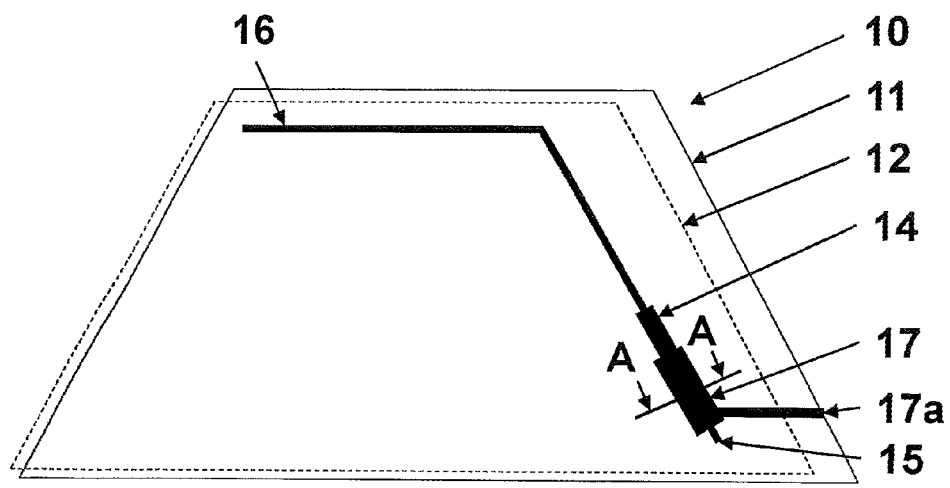
FIG. 3 shows a glazing according to the invention including a contact.

It should be noted that the invention may comprise more than two antennas. While the invention is described with regard to AM, FM, DAB and TV antennas on glass, this should not be regarded as limiting. The invention is applicable to other situations where electromagnetic energy is employed and transmission or reception of electromagnetic energy would be desirable.

The invention is applicable to a glazing comprising at least one ply of plastic material such as laminated glass and bi-layer glazing (i.e. one layer of glass with one plastic layer). Such glazing may further comprise a ply of plastic glazing, annealed, semi-toughened or toughened glass, coated glazing, wired glazing and combinations thereof.

Throughout the figures, identical components having the same purpose are labelled with the same numerals.

Referring to FIG. 1, in the present invention, a substantially planar glazing 10 comprises a ply of glazing material 11. A ply of plastic material 12 is bonded to the ply of glazing material 11. First and second conductors 14, 15 are embedded in the ply of plastic material 12 and are connected to first and second antennas 13, 16. First and second conductors 14, 15 are in direct current isolation from each other and parallel to each other. First and second conductors 14, 15 are thereby arranged such that alternating current coupling occurs between them. First and second conductors 14, 15 are embedded at different depths as will be seen in FIGS. 2a, 2b and 2c.

FIGS. 2a and 2b are cross-sections on line A-A of FIG. 1. The first and second conductors 14, 15 are embedded at depths D1, D2, in the direction of the thickness of the ply of plastic material 12.

The average distance between the first and second conductors 14, 15 is less than or equal to 0.50 millimeters, preferably significantly less than 0.30 millimeters. The width of the first conductor 14 is preferably in the range 0.01 to 0.15 millimeters. The width of the second conductor 15 can be less than the width of the first conductor 14, or vice-versa. The width means the dimension of the conductor 14, 15 which is perpendicular to the length and parallel to the plane of the ply of glazing material 11.

The first conductor 14 may be a strip made from a sheet of conductive material and the second conductor may be a wire. The first and second conductors 14, 15 are shown without insulation.

At least one of the conductive materials 13-16 may be wire. Examples of wire material are copper, tungsten, gold, silver, aluminium, or an alloy thereof, nanowires, carbon nanotube or a combination thereof. If the wire is not in direct current isolation from other conductors at all points along its length then insulation should be used at least at points where there is a risk of unwanted direct current contact. Such localised insulation may be achieved using insulating coating, which may also serve as adhesive.

At least one of the conductive materials 13-16 may be insulated wire. Insulation allows the conductors to be arranged adjacent to each other but in direct current isolation, for example at cross-over points or if wires are parallel and in physical contact with each other. The average distance between two insulated wires may be twice the thickness of the insulation. The thickness of the insulation may be 0.03 millimeters or less. The minimum distance between two insulated wires, which is twice the thickness of insulation, may be 0.06 millimeters or less.

The ply of plastic material 12 may be, but is not limited thereto, polyvinyl butyral (PVB). Preferably the conductor materials 13-16 are insulated wire embedded in PVB. Preferably the thickness of PVB is less than 0.76 millimeters.

FIG. 2c is a cross-section on line A-A of FIG. 1, a glazing according to the invention comprising a first conductor 14 fully overlapping a second conductor 15.

Figures 4A, 4B, 4C:
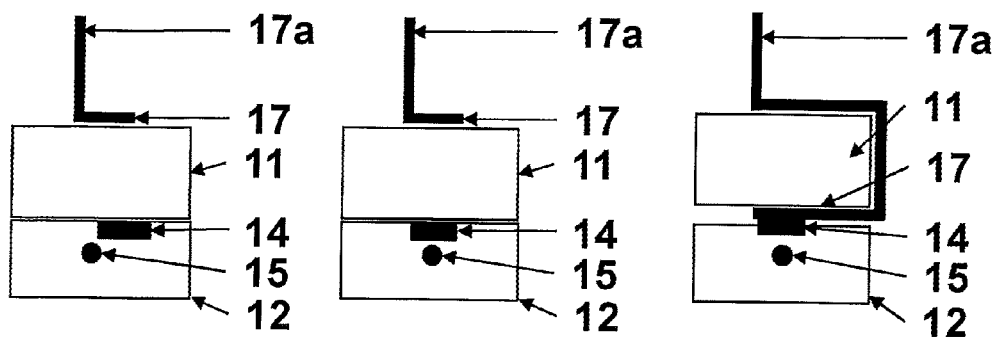
FIG. 4a shows a glazing in cross-section on line A-A of FIG. 3.
FIG. 4b shows a glazing in cross-section in which conductors fully overlap.
FIG. 4c shows a glazing in cross-section in which the contact is in DC contact.

Referring to FIG. 3, a glazing according to the invention, a contact 17 is provided. The contact 17 may be connected to a first conductor 14 either by alternating current coupling, as shown in FIGS. 4a and 4b, or direct current connection, as shown in FIG. 4c. A flexible conductor 17a is shown folded around the edge of the glazing. The first conductor 14 is a sheet of conductive material, at least partially overlapping a second conductor 15. An antenna 16 is connected to the second conductor 15.

The first conductor 14 may be made from a sheet of conductive material, such that the surface area is increased. This may be advantageous for alternating current coupling, or direct current connection, to the contact 17.

Referring to FIG. 4a, a cross-section on line A-A of FIG. 3, a glazing according to the invention is provided comprising a first conductor 14 partially overlapping a second conductor 15. A first ply of glazing material 11 is positioned adjacent to a surface of the ply of plastic material 12. A contact 17 is positioned on the other surface of the first ply of glazing material 11 partially to overlap at least one of the first and second conductors 14, 15, preferably both of them, such that alternating current coupling occurs between the contact 17 and at least one of the first and second conductors 14, 15. A flexible conductor 17a is for connection to an external circuit.

Referring to FIG. 4b, a glazing according to the invention is provided comprising a first conductor 14 overlapping, but spaced from, a second conductor 15.

Referring to FIG. 4c, a glazing according to the invention is provided comprising a contact 17 in direct current connection to a first conductor 14. A flexible conductor 17a is folded in around an edge of the first ply of glazing material 11.

Figure 5:
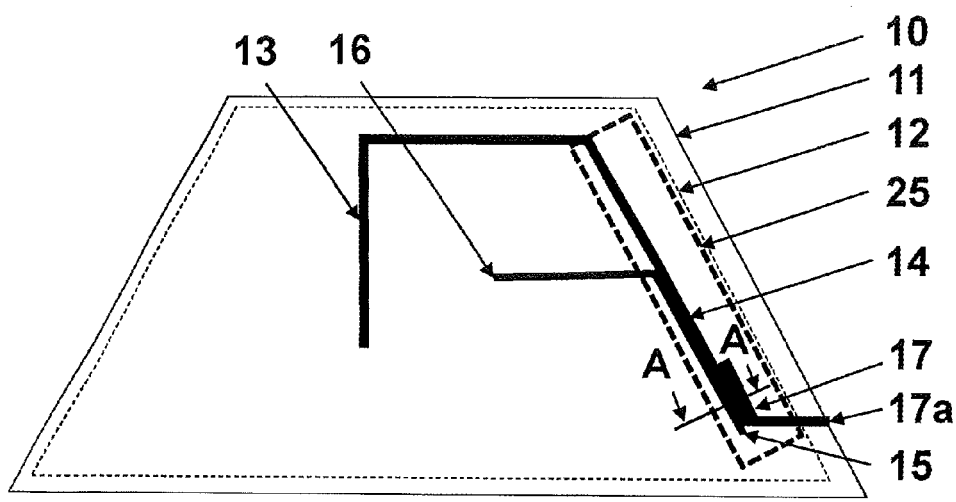
FIG. 5 shows a glazing according to the invention including two antennas.

Referring to FIG. 5, a glazing according to the invention is provided comprising first and second conductors 14, 15 embedded in a ply of plastic material 12, and first and second antennas 13, 16 connected to the first and second conductors 14, 15. A contact 17 is positioned on a surface of a ply of glazing material 11, bonded to the ply of plastic material 12. A flexible conductor 17a is connected to the contact 17.

Figures 6A, 6B, 6C:
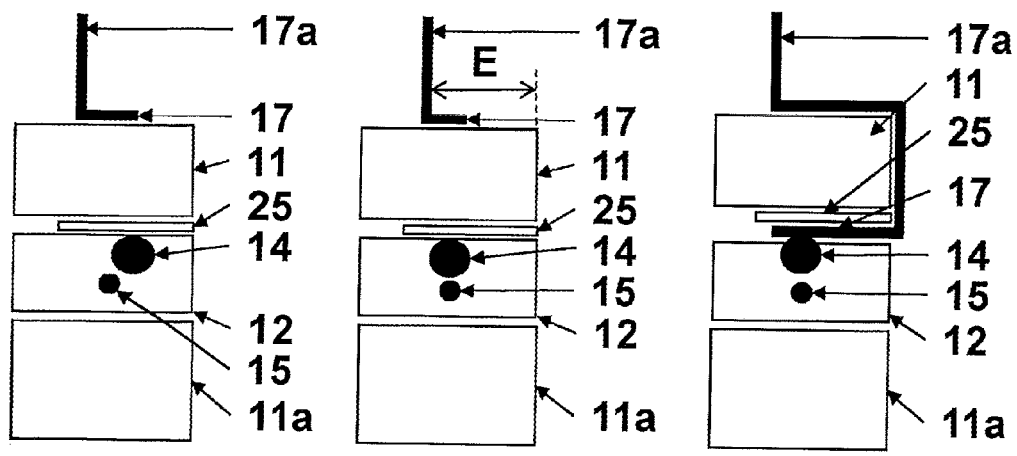
FIG. 6a shows a glazing in cross-section on line A-A of FIG. 5.
FIG. 6b shows a glazing in cross-section in which conductors fully overlap.
FIG. 6c shows a glazing in cross-section in which the contact is in DC contact.

Referring to FIG. 6a, a cross-section on line A-A of FIG. 5, a glazing according to the invention is provided comprising a first conductor 14 partially overlapping a second conductor 15. A first ply of glazing material 11 is positioned adjacent to a surface of the ply of plastic material 12. A second ply of glazing material 11a is positioned on the other surface of the ply of plastic material 12. The first ply of glazing material 11 includes an obscuration band 25, which at least partially hides at least one of the first and second conductors 14, 15, preferably both. The obscuration band 25 is on a surface of the first ply of glazing material 11, preferably on the surface of the first ply of glazing material 11 which is bonded to the ply of plastic material 12. A contact 17 is positioned on the other surface of the first ply of glazing material 11 partially to overlap at least one conductor such that alternating current coupling occurs between them. A flexible conductor 17a, shown in the vertical position, allows connection to an external circuit.

Referring to FIG. 6b, a glazing according to the invention is provided comprising a first conductor 14 overlapping a second conductor 15.

Referring to FIG. 6c, a glazing according to the invention is provided comprising a contact 17 in direct current connection to the first conductor 14. A flexible conductor 17a is folded around an edge of the first ply of glazing material 11.

The position of the flexible conductor 17a in the embodiment of FIG. 6b is such that there is a distance "E" between the edge of the glazing material and the edge of the flexible conductor 17a which is closest to the edge of the ply of glazing material 11. The distance "E" may be configured to be large enough to allow access for process equipment, such as a vacuum ring, to contact the edge of the ply of glazing material 11. The distance "E" may be configured to be small enough so that the flexible conductor 17a is hidden from view by the obscuration band 25.

Figure 7:
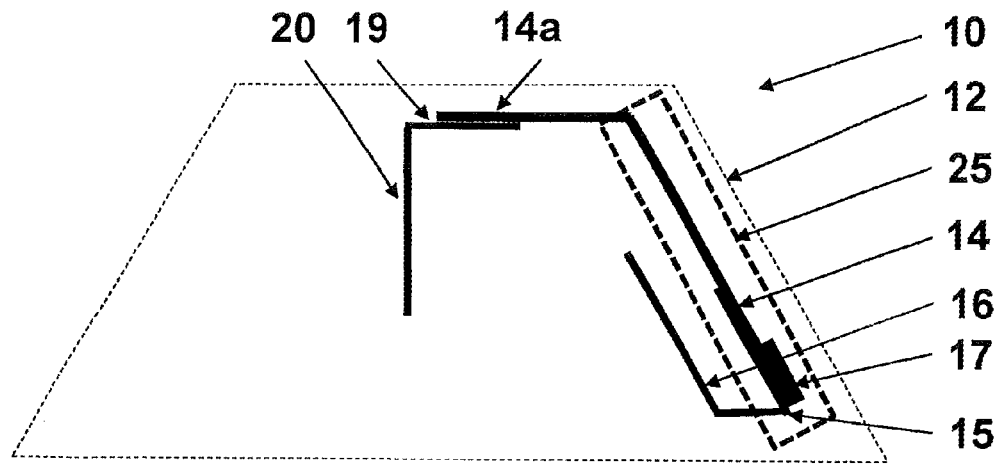
FIG. 7 shows a glazing including three conductors for two antennas.

FIG. 7 shows a glazing similar to the glazing in FIG. 5, but a first conductor 14 comprises an additional conductor 14a. A first antenna is not shown. An advantage of this embodiment is that the first conductor 14 and the additional conductor 14a are in an edge region, optionally hidden under an obscuration band, and the widths of the first and additional conductors 14, 14a are not restrained by the need to be unobtrusive. A second antenna 16 and a third antenna 20 are thinner than the first conductor 14 and so may extend in an area of the glazing in which good vision is required. Unrestrained width of the first conductor 14 is advantageous to reduce electrical resistance.

Figure 8:
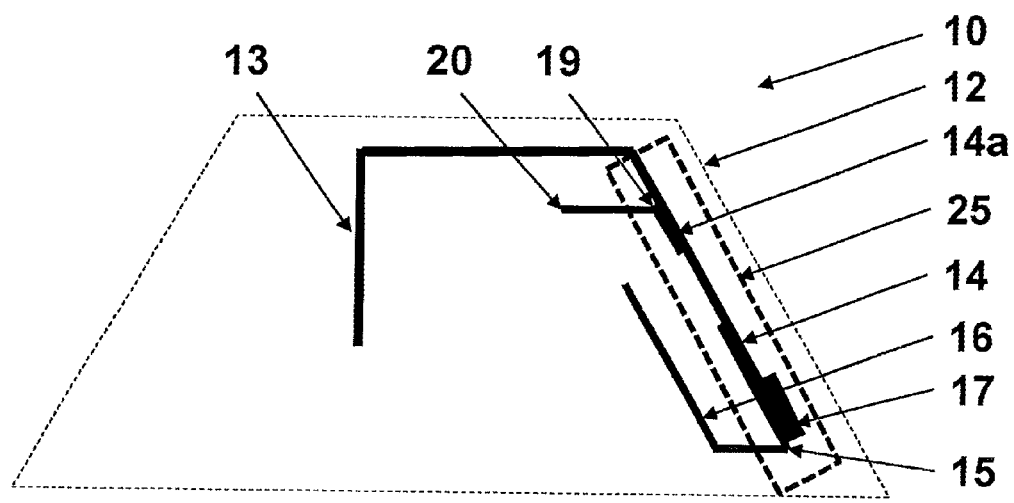
FIG. 8 shows a glazing including three conductors for three antennas.

FIG. 8 shows an alternative glazing according to the invention for three antennas. Third antenna 20 is intended for TV signals, whereas first and second antennas 13, 16 are intended for FM. Second and third conductors 15, 19 are arranged to couple with first and additional conductors 14, 14a respectively. The average distance between the first conductor 14 and the second conductor 15 is less than or equal to 1 millimeter. The average distance between the additional conductor 14a and the third conductor 15 is less than or equal to 0.20 millimeters.

To speed up the manufacturing process, one piece of conductive material is used for the first antenna 13, the additional conductor 14a and the first conductor 14.

Figure 9:
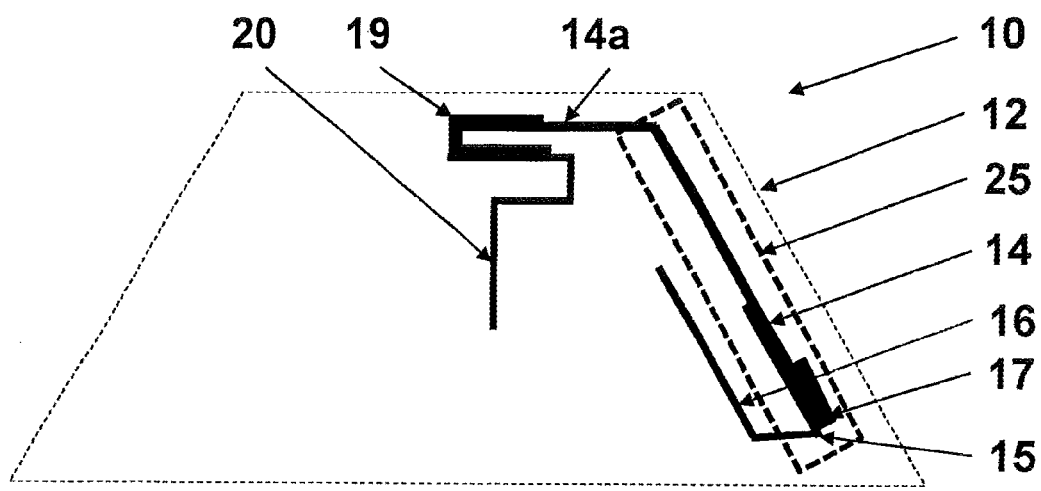
FIG. 9 shows a glazing as FIG. 7 including meander shapes for two conductors.

FIG. 9 is a glazing according to the invention in which an additional conductor 14a and a third conductor 19 each have a meander shape. The meander shape is made of parallel portions and connecting portions. The meander shape is advantageous to accommodate longer conductors in a narrow edge region. An obscuration band 25 may be extended in the narrow edge region to hide the meander shapes from view. A glazing according to the invention having meander-shaped conductors 14a and 19 may have better performance at 1 MHz in the AM medium wave band.

Figure 10:
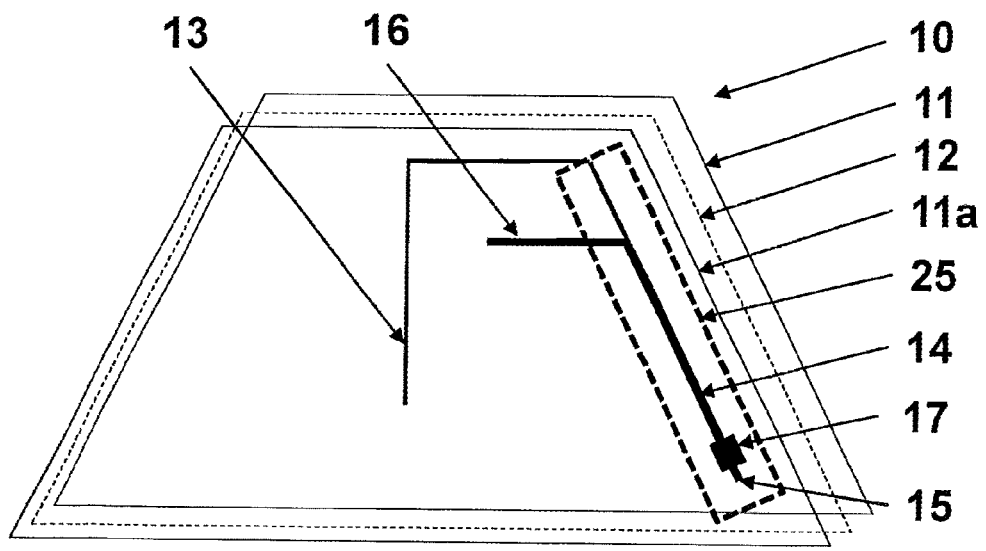
FIG. 10 shows a glazing as FIG. 5 including conductors of different widths.

FIG. 10 is a glazing according to the invention in which a first conductor 14 and a first antenna 13 are thinner than a second conductor 15 and a second antenna 16. This arrangement is advantageous if the first conductor 14 is made of a highly conductive material such as carbon nanotube.

A calculation of optimum length of a conductor will now be disclosed. An effective wavelength in a material depends on the dielectric constants and the dimensions of the dielectric materials nearby. In a region containing electrical conductors, such as a folded coupling region, additional factors apply, dependent on the shape of the conductor and antiparallel current effects, i.e. proximity effects of alternating currents flowing in opposite directions in adjacent parallel sections of a folded conductor.

For example, a signal of frequency 100 MHz has a wavelength in free space of approximately 3 meters, so one quarter wavelength in free space is 0.75 meters. Referring to FIG. 9, an additional conductor 14a on a laminated glazing has a shortening factor of 0.6, so one quarter of Lambda Effective is 0.45 meters. The additional conductor 14a is then formed in a meander shape comprising parallel portions and at least one connecting portion between the parallel portions such that the total length of the conductor 14 is 0.45 meters.

Referring to FIG. 2a, three methods of embedding first and second conductors 14, 15 in a ply of plastic material 12 will now be disclosed. The methods enable conductors 14, 15 to be laid close together such that alternating current coupling occurs therebetween, thereby providing preferred embodiments according to claim 1. The methods may be used alone or in combination.

In a first method, a first conductor 14, coated with plastic material, is laid on the surface of a ply of plastic material 12 and the first conductor 14 is heated, so that the plastic coating melts and acts as a glue to bond the first conductor 14 to the ply of plastic material 12.

In a second method, a first conductor 14 without a coating of plastic material is laid on the surface of a ply of plastic material 12. The first conductor 14 is heated using a heating tool, having a tip of width less than or equal to 4 mm, so that heat is transferred through the first conductor 14 to a region of the ply of plastic material 12 in direct contact with the first conductor 14, causing the region to melt so as to embed the first conductor 14 in the ply of plastic material 12. The heat transfer may be such that the first conductor 14 is only partially embedded, a portion of the thickness of the first conductor 14 protruding above a surface of the ply of plastic material 12. The heat transfer may be such that the region melts and flows over the top of the first conductor 14, submerging the first conductor 14 in the thickness of the ply of plastic material 12.

In methods employing heat to melt the plastic materials to embed two conductors, a first conductor 14 may 'pull away', i.e. be disturbed, when attempts are made to embed a second conductor 15.

This problem is avoided in a third method wherein a second conductor 15 is laid on the surface of a ply of plastic material 12, above the first conductor 14, and is subjected to vibration of ultrasonic frequency using a vibration tool, having a tip of width less than or equal to 4 mm.

Thus the second conductor 15 is embedded in the ply of plastic material 12. A suitable vibration tool is an ultrasonic soldering machine, which employs ultrasonic frequencies in the range 15 kHz to 70 kHz, such as that sold as "Sureweld" available from Sonobond Ultrasonics Inc. Ultrasonic vibration tool may also be used to embed the first conductor 14.

The invention according to claim 1 has the advantage that connection from a plurality of antennas to an external circuit is achievable via one contact in a more compact arrangement on a glazing. By embedding conductors at different depths, the conductors may be positioned closer to each other than was possible in the prior art and be less obtrusive in plan view. For example, three antennas, the length of each antenna selected for a particular communication system such as FM, DAB and TV, may be configured unobtrusively at the edge of the glazing, taking up less area of the glazing.

A further advantage is that the invention enables first and second conductors of different widths, embedded at different depths in the ply of plastic material, to be hidden from view under an obscuration band. The invention also allows an antenna to be used in a vision area because it is thinner, and therefore less obtrusive.

What is claimed is:

1. A substantially planar glazing, comprising:
    a ply of glazing material;
    a ply of plastic material bonded to the ply of glazing material;
    at least first and second antennas, embedded in the ply of plastic material;
    at least first and second conductors, connected to the first and second antennas;
    wherein the first and second conductors are in direct current isolation from each other, configured so that the first conductor runs adjacent to, and substantially parallel to, the second conductor, so that alternating current coupling occurs therebetween;
    wherein
    the first and second conductors are embedded at different depths in the thickness of the ply of plastic material such that when viewed along a line perpendicular to the plane of the glazing one conductor is at least partially obscured by the other.

2. A glazing according to claim 1, wherein the average distance between the first and second conductors is less than 1 millimeter.

3. A glazing according to claim 1, wherein the first and second conductors fully overlap each other in the direction of the thickness of the ply of plastic material.

4. A glazing according to claim 1, wherein a contact is on a surface of the ply of glazing material in direct current isolation from the first and second conductors and the contact overlaps at least one conductor so that alternating current coupling occurs therebetween.

5. A glazing according to claim 1, wherein a contact has conductive connection to the first conductor and is in direct current isolation from the second conductor, so that the first and second conductors share a single connection to an external circuit via the contact so enabling a transfer of signals from the first and second conductors to the external circuit.

6. A glazing according to claim 1, wherein a flexible conductor in direct current connection with a contact is folded around an edge of the ply of glazing material.

7. A glazing according to claim 1, wherein the second conductor is thinner than the first conductor.

8. A glazing according to claim 7, wherein the thin second conductor is connected to a thin second antenna which is positioned in a vision area of the glazing.

9. A glazing according to claim 1, wherein at least one conductor is at least partially hidden from view by an obscuration band.

10. A glazing according to claim 1, wherein a third conductor is configured adjacent to a portion of the first conductor, wherein the first and second conductors are in direct current isolation from the third conductor and the third conductor is substantially parallel to the portion, so that alternating current coupling occurs therebetween.

11. A glazing according to claim 1, wherein the length of the second conductor is selected to be approximately equal to an odd multiple of a quarter of an effective wavelength in the glazing Lambda Effective corresponding to a resonant frequency f, such that the second conductor and the first conductor form a transmission line acting as a band-pass filter, and signals in the second conductor in a bandwidth centred on frequency f are transferred to the first conductor by alternating current coupling.

12. A glazing according to claim 1, wherein at least one conductor is insulated wire and the wire diameter, including insulation, is less than 0.21 millimeters.

13. A glazing according to claim 1, wherein at least one conductor is insulated wire and the wire diameter, including insulation, is less than 0.16 millimeters.

14. A glazing according to claim 1, wherein at least one conductor is insulated wire and the wire diameter, including insulation, is less than 0.09 millimeters.

15. A method of manufacturing a glazing, comprising:
providing a ply of glazing material;
providing a ply of plastic material, bonded to the ply of glazing material;
providing at least first and second antennas, embedded in the ply of plastic material;
providing at least first and second conductors, connected to the first and second antennas;
wherein the first and second conductors are in direct current isolation from each other, configured so that at least a portion of the first conductor runs adjacent to, and substantially parallel to, a portion of the second conductor, so that alternating current coupling occurs therebetween; and
embedding the first and second conductors at different depths in the ply of plastic material such that when viewed along a line perpendicular to the plane of the glazing one conductor is at least partially obscured by the other.

16. A method according to claim 15, further comprising configuring the first and second conductors to fully overlap each other in the direction of the thickness of the ply of plastic material.

17. A method according to claim 15, wherein the embedding of the first and second conductors comprises embedding the first and second conductors by means of an ultrasonic soldering tool having a tip of width less than or equal to 4 millimeters.

* * * * *